(12) United States Patent
Nesbitt

(10) Patent No.: US 9,992,148 B2
(45) Date of Patent: Jun. 5, 2018

(54) NOTIFYING A USER ABOUT A PREVIOUS CONVERSATION

(71) Applicant: International Business Machines Corporation, Armonk, NY (US)

(72) Inventor: Pamela A. Nesbitt, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 14/886,832

(22) Filed: Oct. 19, 2015

(65) Prior Publication Data
US 2017/0111303 A1    Apr. 20, 2017

(51) Int. Cl.
| | |
|---|---|
| *G06F 15/16* | (2006.01) |
| *H04L 12/58* | (2006.01) |
| *G06N 5/02* | (2006.01) |
| *H04L 29/08* | (2006.01) |
| *G06N 5/04* | (2006.01) |
| *G06N 3/00* | (2006.01) |
| *G06N 99/00* | (2010.01) |
| *G06F 3/0481* | (2013.01) |
| *G06F 3/0484* | (2013.01) |
| *G06F 17/27* | (2006.01) |

(52) U.S. Cl.
CPC .......... *H04L 51/24* (2013.01); *G06F 3/04817* (2013.01); *G06F 3/04842* (2013.01); *G06F 17/2765* (2013.01); *G06F 17/2785* (2013.01); *G06N 3/006* (2013.01); *G06N 5/02* (2013.01); *G06N 5/04* (2013.01); *G06N 99/005* (2013.01); *H04L 51/12* (2013.01); *H04L 51/16* (2013.01); *H04L 51/32* (2013.01); *H04L 51/36* (2013.01); *H04L 51/38* (2013.01); *H04L 67/22* (2013.01); *H04L 67/306* (2013.01)

(58) Field of Classification Search
CPC ........ G06N 99/005; G06N 5/02; G06N 3/006; G06N 5/04; H04L 67/306; H04L 51/32; H04L 67/22; H04L 51/12
USPC .................................... 709/206–208
See application file for complete search history.

(56) References Cited

U.S. PATENT DOCUMENTS

| | | | |
|---|---|---|---|
| 8,638,908 B2 | 1/2014 | Leeds et al. | |
| 8,892,672 B1 * | 11/2014 | Rackliffe | ................ H04L 51/32 709/206 |
| 2004/0128359 A1 * | 7/2004 | Horvitz | ................ G05B 19/404 709/207 |
| 2010/0022279 A1 | 1/2010 | Hoberg et al. | |

(Continued)

*Primary Examiner* — Chris Parry
*Assistant Examiner* — Weiwei Stiltner
(74) *Attorney, Agent, or Firm* — Fabian VanCott; Steven L. Nichols (57) ABSTRACT

Notifying a user about a previous conversation includes based on an analysis of the previous conversation between a first user and second user determining a characterization between the first user and the second user, in response to the first user selecting, via a user device, an option to open a subsequent conversation with the second user, notifying the first user via an alert as to the characterization of the previous conversation that the first user had with the second user before reengaging the second user in a subsequent conversation, and based on an analysis of the subsequent conversation between the first user and the second user, updating the characterization to a current characterization in a database.

13 Claims, 6 Drawing Sheets

(56) References Cited

U.S. PATENT DOCUMENTS

2010/0174813 A1\* 7/2010 Hildreth ............ G06F 17/30943
  709/224
2013/0282841 A1\* 10/2013 Bates ...................... H04L 51/32
  709/206
2016/0317074 A1\* 11/2016 Kawai .................... G06Q 30/02

\* cited by examiner

NOTIFYING A USER ABOUT A PREVIOUS CONVERSATION

BACKGROUND

User devices, such as mobile phones, personal computers, and tablets allow a user to initiate a conversation with another user. The users may be individuals or a group of individuals. The conversation may be realized between the users via the user devices as an instant message (IM), an electronic mail (email), a live video, a phone call, or a short message service (SMS).

BRIEF SUMMARY

A method for notifying a user about a previous conversation includes based on an analysis of a previous conversation between a first user and a second user, determining a characterization of the previous conversation between the first user and the second user, in response to the first user selecting, via a user device, an option to open a subsequent conversation with the second user, notifying the first user via an alert as to the characterization of the previous conversation that the first user had with the second user before reengaging the second user in the subsequent conversation, and based on an analysis of the subsequent conversation between the first user and the second user, updating the characterization to a current characterization in a database.

A system for notifying a user about a previous conversation includes a processor, computer program code, communicatively coupled to the processor, the computer program code includes a relationship determining engine to determine a relationship between a first user and a second user, the relationship used as a standard to determine how a previous conversation and a subsequent conversation is to be analyzed, a characterization determining engine to, based on an analysis of the previous conversation between the first user and the second user, determine a characterization of the previous conversation between the first user and the second user, a storing engine to store, in a database, the characterization associated with the previous conversation between the first user and the second user, a notifying engine to, in response to the first user selecting, via a user device, an option to open the subsequent conversation with the second user, notify the first user via an alert as to the characterization of the previous conversation that the first user had with the second user before reengaging the second user in the subsequent conversation, and an updating engine to, based on an analysis of the subsequent conversation between the first user and the second user, update the characterization to a current characterization in the database.

A machine-readable, non-volatile storage medium encoded with instructions, the instructions executable by a processor of a system to cause the system to, based on an analysis of a previous conversation between a first user and a second user, determine a characterization of the previous conversation between the first user and the second user, and in response to the first user selecting, via a user device, an option to open the subsequent conversation with the second user, notify the first user via an alert as to the characterization of the previous conversation that the first user had with the second user before reengaging the second user in the subsequent conversation.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

The present specification describes a method and system for notifying a user about a previous conversation, such that the user is notified via an alert as to a characterization of a previous conversation that the user had with another user before reengaging the other user in a subsequent conversation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, Characterization-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing Characterization information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, user devices allow users to initiate conversations with each other. To initiate a conversation, a first user may select another user, via a contact list, on their user device to initiate the conversation. If the conversation is an instant message (IM), an electronic mail (email), or a short message service (SMS), the first user may type a message on their user device and send the message to selected user. The selected user may in turn view and respond to the message sent by the first user. If the conversation is realized as a live video or a phone call the first user uses audio and video features on their user device to communicate with the other user. As a result, the user devices allow users to initiate conversations with each other.

The first user may initiate hundreds of conversations with the other users during a period of time. The first user may initiate several conversations with the same user during the period of time. Initiating hundreds of conversations with other users and conversations with the same user during the period of time may result in the first user forgetting how pervious conversations with the other users ended. As a result, the first user is to recall, from memory, how each of the conversations ended to determine how to proceed before reengaging in subsequent conversations with the other users. This may be a burdensome task for the user.

The principles described herein include a method for notifying a user about a previous conversation. Such a method includes based on an analysis of a previous conversation between a first user and a second user, determining a characterization of the previous conversation between the first user and the second user, in response to the first user selecting, via a user device, an option to open a subsequent conversation with the second user, notifying the first user via an alert as to the characterization of the previous conversation that the first user had with the second user before reengaging the second user in the subsequent conversation, and based on an analysis of the subsequent conversation between the first user and the second user, updating the characterization to a current characterization in a database. Such a method allows the first user to be notified, via an alert, as to how the previous conversation with the second user ended. As a result, the first user will know the state in which they left a previous conversation in order to enable them to make an informed decision about how to proceed once they reengage in a subsequent conversation with the second user.

In the present specification and in the appended claims, the term "conversation" means a visual, written, and/or verbal exchange of words and/or characters between a first user and second user via user devices. The conversation may be realized as an IM, an email, a live video, a phone call, or a SMS. The conversation may be a previous conversation that has happened in the past between the first user and the second user. The conversation may be a subsequent conversation that is happening in the present or may happen near future between the first user and the second user.

In the present specification and in the appended claims, the term "first user" means a specific individual that may engage a second user, such as another individual, in a conversation via a user device. The first user or the second user may be a group of individuals. The first user may initiate a conversation with a second user. The first user may receive an indication that the second user desires to initiate a conversation.

In the present specification and in the appended claims, the term "characterization" means a depiction of a tone, mood, or attitude expressed in a conversation between a first user and a second user. The characterization of the conversation between the first user and second user may be symbolic such as a positive characterization, a neutral characterization, or a negative characterization. A characterization may be associated with a previous conversation. A characterization may be a current characterization that is associated with a subsequent conversation.

In the present specification and in the appended claims, the term "alert" means a visual, audible, or physical mechanism of a user device that is used to notify a first user as to a characterization of a previous conversation that the first user had with the second user before reengaging each other in a subsequent conversation. The alert may include a display alert, a light-emitting diode (LED) alert, a vibration alert, an audio alert, or combinations thereof.

In the present specification and in the appended claims, the term "relationship" means a manner in which a first user and a second user associate with each other during a conversation. The relationship may be based on an assessment of a number of conversations between the first user and the second user. Further, the relationship may be used as a standard to determine how a conversation is to be analyzed. The relationship may be symbolic such as a positive relationship, a neutral relationship, or a negative relationship.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
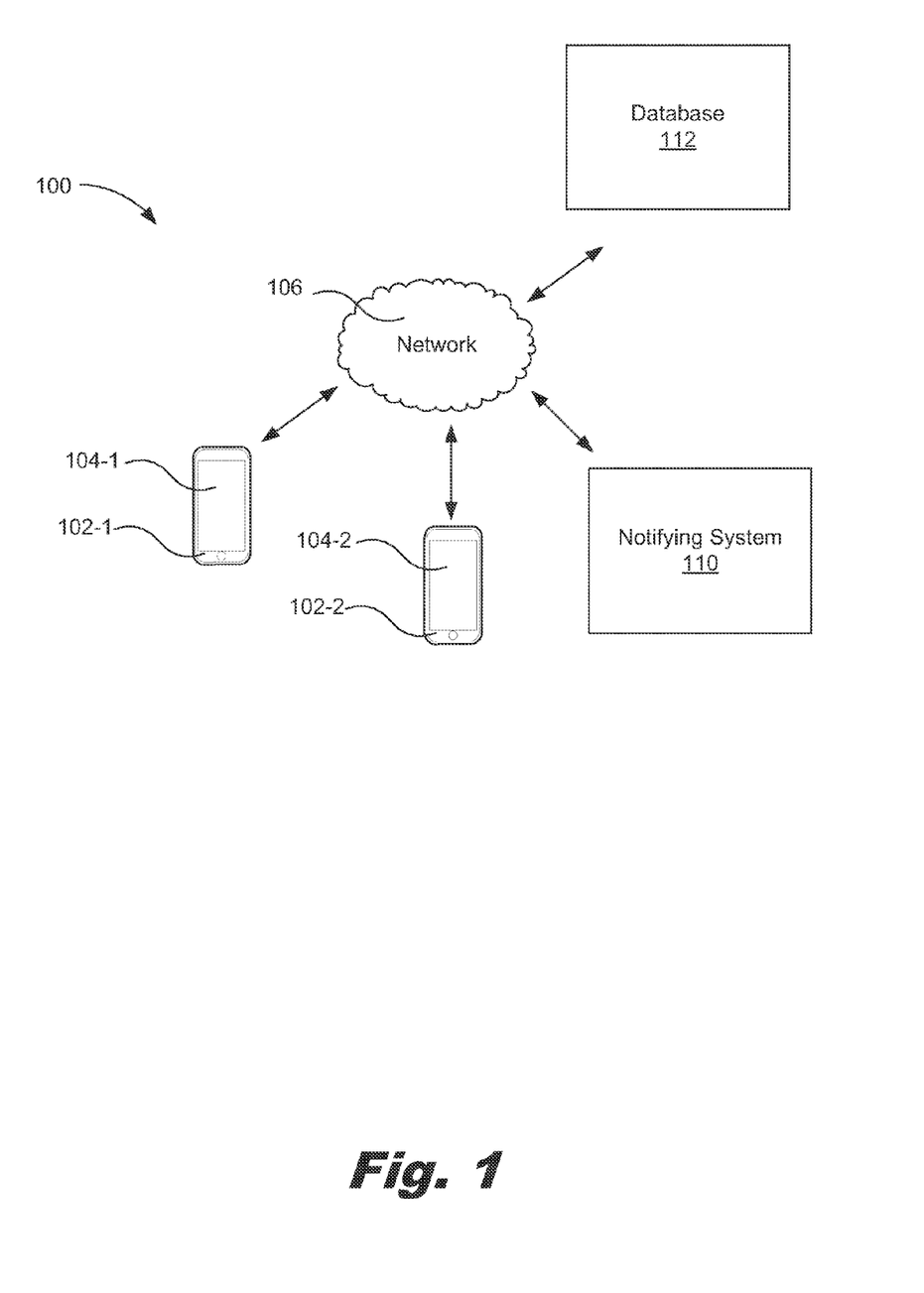
FIG. 1 is a diagram of an example of a system for notifying a user about a previous conversation, according to one example of principles described herein.

Referring now to the figures, FIG. 1 is a diagram of an example of a system for notifying a user about a previous conversation, according to one example of principles described herein. As will be described below, a notifying system is in communication with a network to, based on an analysis of a previous conversation between a first user and second user determine a characterization between the first user and the second user. Further, the notifying system to, in response to the first user selecting, via a user device, an option to open a subsequent conversation with the second user, notify the first user via an alert as to the characterization of the previous conversation that the first user had with the second user before reengaging the second user in a subsequent conversation. The notifying system to, based on an analysis of the subsequent conversation between the first user and the second user, update the characterization to a current characterization in the database.

As illustrated, the system (100) includes a number of user devices (102) with displays (104). For example, the system (100) includes user device A (102-1) with display A (102-1). The system (100) includes user device B (102-2) with display B (102-2). As will be described below, each of the user devices (102) may be associated with a user. For example, user device A (102-1) may be associated with a first user. User device B (102-2) may be associated with a second user. The user devices (102) allow users to initiate conversations with each other. Further, an alert may be activated on the user devices (102) when the users are about to reengage in a subsequent conversation. The alert may be a visual, audible, or physical mechanism of the user devices (102) that is used to notify a first user as to a characterization of a previous conversation that the first user had with the second user before reengaging each other in a subsequent conversation. The alert may include a display alert, a LED alert, a vibration alert, an audio alert, or combinations thereof. More information about the user devices (102) and the alerts will be described in other parts of this specification.

The system (100) further includes a database (112). As will be described below, the database (112) may store, in memory, metadata associated with the first user. The metadata may include users that the first user has initiated conversations with, characterizations, current characterizations, relationships, alerts, and user preferences. The metadata in the database (112) may aid a notifying system (110) in analyzing conversations between the first user and the second user and how to notify the first user via an alert as to a characterization of a previous conversation that the first user had with the second user before reengaging each other in a subsequent conversation. More information about the database (112) will be described in other parts of this specification.

The system (100) further includes a notifying system (110). The notifying system (110) may be in communication with the user devices (102) and the database (112) over a network (106).

The notifying system (110) determines, based on an analysis of a previous conversation between a first user and second user, a characterization between the first user and the second user. As will be described below, the characterization is determined based on keywords, emoticons, natural language processing (NLP), or combinations thereof extracted during the previous conversation.

The notifying system (110) in response to the first user selecting, via a user device, an option to open a subsequent conversation with the second user, notifying the first user via an alert as to the characterization of the previous conversation that the first user had with the second user before reengaging the second user in a subsequent conversation. For example, if user device A (102-1) is associated with the first user, the alert is activated on user device A (102-1) before reengaging the second user in a subsequent conversation.

The notifying system (110) updates, based on an analysis of the subsequent conversation between the first user and the second user, the characterization to a current characterization in the database. In an example, the current characterization updates the alert associated with the second user to reflect the subsequent conversation between the first user and the second user. As a result, the first user will know the state in which they left a previous conversation in order to enable them to make an informed decision about how to proceed once they reengage in a subsequent conversation. More information about the notifying system (110) will be described later on in this specification.

While this example has been described with reference to the notifying system being located over the network, the notifying system may be located in any appropriate location according to the principles described herein. For example, the notifying system may be located in a user device, a server, a database, other locations, or combinations thereof.

While this example has been described with reference to the database being located over the network, the database may be located in any appropriate location according to the principles described herein. For example, the database may be located in a user device, a server, a notifying system, other locations, or combinations thereof.

Figure 2:
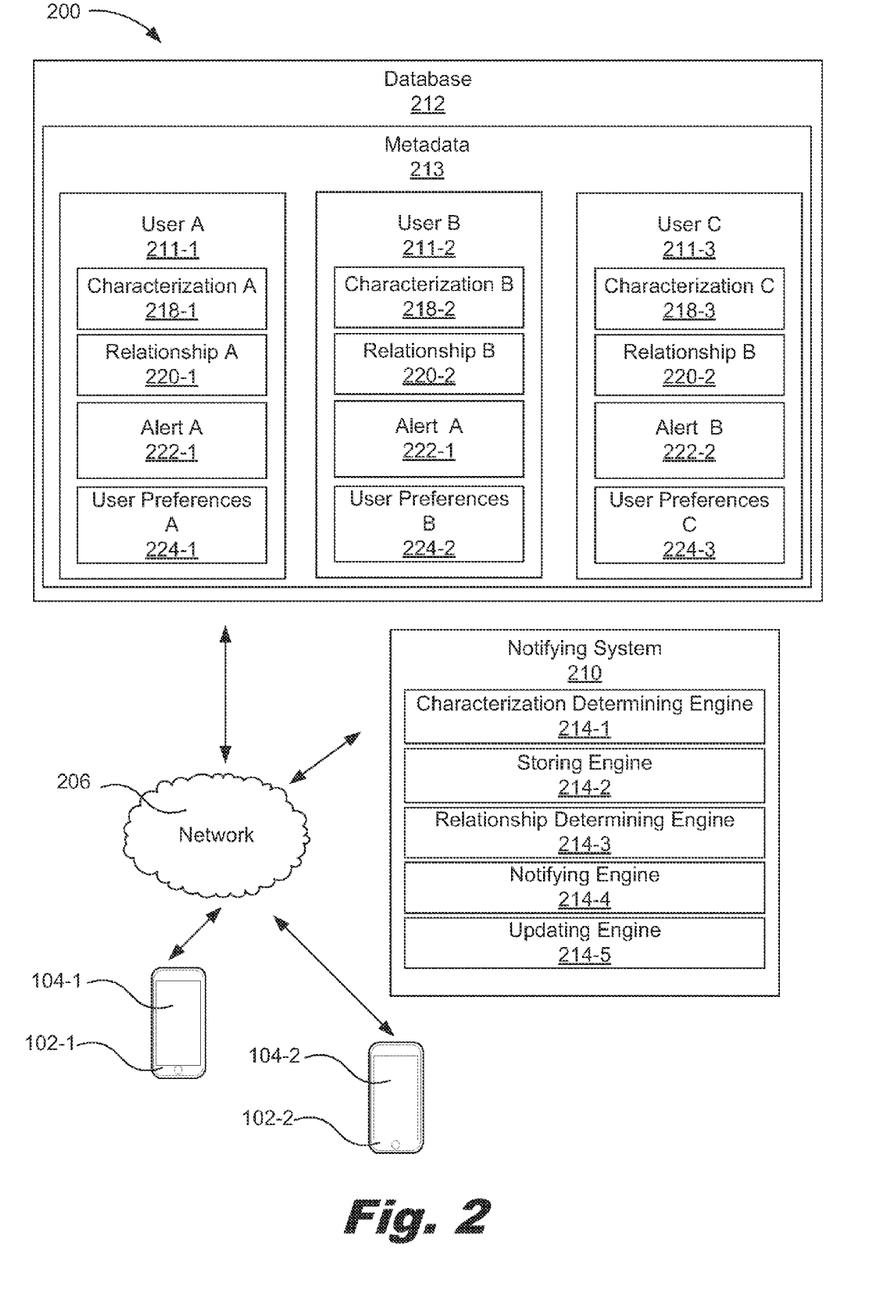
FIG. 2 is a diagram of an example of a system for notifying a user about a previous conversation, according to one example of principles described herein.

FIG. 2 is a diagram of an example of a system for notifying a user about a previous conversation, according to one example of principles described herein. As will be described below, a notifying system is in communication with a network to, based on an analysis of a previous conversation between a first user and second user determine a characterization between the first user and the second user. Further, the notifying system to, in response to the first user selecting, via a user device, an option to open a subsequent conversation with the second user, notify the first user via an alert as to the characterization of the previous conversation that the first user had with the second user before reengaging the second user in a subsequent conversation. The notifying system to, based on an analysis of the subsequent conversation between the first user and the second user, update the characterization to a current characterization in the database.

As illustrated, the system (200) includes a number of user devices (202) with displays (204). For example, the system (200) includes user device A (202-1) with display A (202-1). The system (200) includes user device B (202-2) with display B (202-2). As mentioned above, each of the user devices (202) may be associated with a user. For example, user device A (202-1) may be associated with a first user. Further, user device B (202-2) may be associated with user B. Although not illustrated, the system (200) may include other user devices associated with other users. The user devices (202) allow the users to initiate conversations with each other. To initiate a conversation the first user may select a second user, via a contact list displayed on display A (104-1), on user device A (102-1) to initiate the conversation. This may include selecting the second user's name, an image associated with a second user, or a phone number or email address associated with the second user. Once the first user selects the second user, the conversation may be initiated via an email, SMS, a video, or audio. Further, display A (104-1) of user device A (102-1) may be used to display an alert to the first user before reengaging the second user in a subsequent conversation. As will be described below, the user devices (102) may include a number of other features used as an alert to notify the first user via the alert as to the characterization of the previous conversation that the first user had with the second user before reengaging the second user in a subsequent conversation.

The system (200) further includes a database (212). As illustrated, the database (212), may store in memory, metadata (213). The metadata (213) may include information about other users such as contacts of a first user. This information may aid a notifying system (210) in determining an alert to activate on the first user's user device (202-1) before the first user and a second user reengage in a subsequent conversation.

The metadata (213) may include a number of users. For example, the metadata (213) may include user A (211-1), user B (211-1), and user C (211-3). The users (211) may be associated with a contact list stored in the first user's user device. As a result, each of the users (211) may have engaged the first user in a previous conversation. In an example, the user (211) that is about to reengage the first user in a subsequent conversation may be a second user. For example, if user A (211-1) is about to reengage the first user in a subsequent conversation user A (211-1) may be the second user. If user A (211-1) and user B (211-2) is about to reengage the first user in a subsequent conversation together, user A (211-1) and user B (211-2) may be the second user.

Further, the metadata (213) may include a number of characterizations (218-1). The characterizations (218) may be a depiction of a tone, mood, or attitude expressed in a conversation between the first user and a second user. The characterizations (218) may be for previous conversations or the characterizations (218) may be current characterizations for subsequent conversations between the first user and second of the users (211). The characterizations (218) may be based on a number of previous conversations the first user had with each of the users (211). The characterization (218) of the conversation between the first user and the users (211) may be symbolic such as a positive characterization, a neutral characterization, or a negative characterization. A characterization that is a negative characterization may indicate that the conversation between the first user and the users (211) is negative. A characterization that is a positive characterization may indicate that the conversation between the first user and the users (211) is positive. Further, the characterizations (218) may be a numeric range such as 0 to 10. A characterization that is 0 may indicate that the conversation between the first user and the users (211) is negative. A characterization that is 10 may indicate that the conversation between the first user and the users (211) is positive.

As illustrated, the characterizations (218) include characterization A (218-1), characterization B (218-2), and characterization C (218-3). Characterization A (218-1) may be 0 to indicate the tone, mood, or attitude expressed in at least a previous conversation between a first user and user A (211-1) was negative. Characterization B (218-2) may be 10 to indicate the tone, mood, or attitude expressed in at least a previous conversation between a first user and user B (211-10) was positive. Characterization C (218-3) may be 4 to indicate the tone, mood, or attitude expressed in at least a previous conversation between a first user and user C (211-2) was neutral.

Further, the metadata (213) may include a number of relationships (220). The relationships (220) may be a manner in which the first user and at least a second user associate with each other during a conversation. The relationship may be based on an assessment of a number of conversations between the first user and the second user. The assessment may be based on a notifying system extracting keywords during the number of conversations. As a result, a history of how the first user and a second user associate with each other during a conversation may be determined.

Further, the relationship (220) may be used as a standard to determine how a conversation is to be analyzed. For example, siblings may often argue during a conversation. Alternatively, colleagues may never argue during a conversation. As a result, the relationship (220) may be used to determine, for example, if arguing is normal or not during a conversation between the first user and the second user. Thus the relationships (220) may influence the characterizations (218).

The relationships (220) may be associated with each of the users (211). For example, relationship A (220-1) may be associated with user A (211-1). Relationship B (220-2) may be associated with user B (211-2) and user C (211-3). The relationship may be symbolic such as a positive relationship, a neutral relationship, or a negative relationship. A negative relationship indicates the conversations between the first user and the second user is often negative and the notifying system (210) is to interpret this negativity in the conversations as if they were positive conversations. A positive relationship indicates the conversations between the first user and the second user is often positive and the notifying system (210) is to interpret these conversations as if they were positive conversations. Further, the relationship may be a numeric range such as 0 to 10. A relationship that is 0 indicates the conversations between the first user and the user is often negative. A relationship that is 10 indicates the conversations between the first user and the user is often positive. As a result, the relationship (220) may determine how the notifying system (210) analyses the previous conversation and the subsequent conversation between the first user and the users (211). In an example, relationship A (220-1) may be a positive relationship and relationship B (220-2) may be a negative relationship.

In other examples, the relationships may be based on how the first user is related to the second user. For example, if the first user and user A (211-1) are siblings, relationship A (220-1) may reflect this relation such that even though there may be negativity in their conversations, relationship A (220-1) may influence characterization A (218-1) accordingly.

In some examples, the relationships (220) may be determined based on at least one previous conversation. In other examples, the first user may manually specify the relationships (220). The first user may manually specify the relationships (220) via the user preferences as described below.

Further, the metadata may include alerts (222). The alerts (222-1) may be a visual, audible, or physical mechanism of a user device that is used to notify a first user as to a characterization of a previous conversation that the first user had with the second user before reengaging each other in a subsequent conversation. The alert may include a display alert, a LED alert, a vibration alert, an audio alert, or combinations thereof. The alerts (222) may be associated with each of the users (211). For example, alert A (222-1) may be associated with user A (211-1) and user B (211-2). Alert B (222-2) may be associated with user C (211-3). Alert A (222-1) may be a display alert. Alert B (222-2) may be an LED alert. The alerts (222) may specify the type of alert or how to notify the first user as to the characterization of the previous conversation. More information about the alerts (222) will be described in other parts of this specification.

Further, the metadata (213) may include user preferences (224). The user preferences (224) may be associated with each of the users (211). For example, user preferences A (224-1) may be associated with user A (211-1). User preferences B (224-2) may be associated with user B (211-2). User preferences C (224-3) may be associated with user C (211-3). The user preferences (224) may define the alerts (222) and the relationships (220). In some example, a graphical user interface (GUI) may be displayed on display A (204-1) for the first user. The GUI may include textboxes, radio buttons, and/or check boxes to allow the first user to define the user preferences (224). For example, the GUI may display a number of radio buttons to allow the first user to define a relationship with another user such as a second user. The radio buttons may include a positive relationship, a neutral relationship, and a positive relationship. The first user may select the positive relationship, the neutral relationship, or the positive relationship radio button. Upon selecting the radio button, the user preference is made for the second user. Similarly, the first user may define the type of alert, images, LED colors, audio, and other alerts to activate before reengaging the second user in a subsequent conversation.

The system (200) further includes a notifying system (210). In one example, the notifying system (210) includes a processor and computer program code. The computer program code is communicatively coupled to the processor. The computer program code includes a number of engines (214). The engines (214) refer to program instructions for performing a designated function. The computer program code causes the processor to execute the designated function of the engines (214). In other examples, the engines (214) refer to a combination of hardware and program instructions to perform a designated function. Each of the engines (214) may include a processor and memory. The program instructions are stored in the memory and cause the processor to execute the designated function of the engine. As illustrated, the notifying system (204) includes a characterization determining engine (214-1), a storing engine (214-2), a relationship determining engine (214-3), a notifying engine (214-4), and an updating engine (214-5).

As mentioned above, the notifying system (210) includes the characterization determining engine (214-1). The characterization determining engine (214-1) to, based on an analysis of a previous conversation between a first user and second user determines a characterization between the first user and the second user. The characterization is determined based on keywords, emoticons, natural language processing (NLP), or combinations thereof extracted during the previous conversation.

For example, keywords such as great, good job, excellent, and fantastic extracted during the previous conversation may indicate that the previous conversation between the first user and the second user is going good. As a result, the characterization for the previous conversation may be positive. Alternatively, keywords such as this is not good, you could have done better, why wasn't this done properly, or other similar keywords extracted during the previous conversation may indicate that the previous conversation between the first user and the second user is going bad. As a result, the characterization for the previous conversation may be negative.

Similarly, emoticons such as thumbs up or thumbs down may also indicate the characterization for the previous conversation. Often, if the previous conversations are verbal, NLP may be used to extract phrases and keywords similarly as described above to determine the characterization for the previous conversation.

As mentioned above, the notifying system (210) includes the storing engine (214-2). The storing engine (214-2) stores, in the database (212), the characterization associated with the previous conversation between the first user and the second user. In some examples, the storing engine (214-2) stores, in the database (212), current characterization associated with a subsequent conversation between the first user and the second user. As a result, a characterization is updated each time the first user reengages another user in a subsequent conversation.

As mentioned above, the notifying system (210) includes the relationship determining engine (214-3). The relationship determining engine (214-3) to, determine a relationship between the first user and the second user, the relationship used as a standard to determine how the previous conversation and the subsequent conversation are to be analyzed. The relationships (220) may be a manner in which a first user and at least a second user associate with each other during a conversation. The relationship may be used as a standard to determine how a conversation is to be analyzed. For example, siblings may often argue during a conversation. As a result, the relationship determining engine (214-3) may determine that even if a conversation between siblings is argumentative the characterization may still be positive. Alternatively, colleagues may never argue during a conversation. As a result, the relationship determining engine (214-3) may determine that if a conversation between the colleagues is argumentative the characterization may not be positive.

Further, a threshold may be associated with each of the relationships (220). For example, if siblings argue during a conversation, the threshold may indicate when the characterization may change from a positive characterization to a negative characterization. The threshold may be associated with a number of keywords that are negative. For example, if more than five negative keywords are exchanged between the siblings in a conversation the characterization may change from a positive characterization to a negative characterization.

As mentioned above, the notifying system (210) includes the notifying engine (214-4). The notifying engine (214-4) to, in response to the first user selecting, via a user device, an option to open a subsequent conversation with the second user, notify the first user via an alert as to the characterization of the previous conversation that the first user had with the second user before reengaging the second user in a subsequent conversation. The alert is customizable by the first user based on user preferences (224) associated with the second user. The user preferences may define the type of alert, what the alert displays, the color of LED, the vibration associated with the alert, and the audio associated with the alert. For example, the user preferences (224) may define the duration of the vibration associated with the alert, if the alert is a vibration alert. In this example, the user preferences (224) define that for a positive characterization between the first user and the second user a vibration mechanism for user device A (102-1) is activated for three seconds. The user preferences (224) define that for a neutral characterization between the first user and the second user a vibration mechanism for user device A (102-1) is activated for three seconds then is inactive for three second then activated for three seconds. The user preferences (224) define that for a negative characterization between the first user and the second user a vibration mechanism for user device A (102-1) is activated for fifteen seconds. As a result, the vibration alert is customizable by the first user based on user preferences (224) associated with the second user. Similarly, the other types of alerts may be customized in a similar fashion.

As noted above, the alerts (222) may be defined base via the user preferences (224). In some examples, the first user defines, via the user preferences (224), alerts for positive characterizations, neutral characterizations, and negative characterizations. The alerts (222) may be specific for each of the users (211).

As will be described in FIGS. 3, a display alert may display a specific animation, video, or image to notify the first user before reengaging the second user in a subsequent conversation.

The alert may be a LED alert. An LED associated with a user device (102) may change colors based on the characterization to notify the first user before reengaging the second user in a subsequent conversation. For example, the LED may turn green to indicate the characterization of the previous conversation that the first user had with the second user before reengaging the second user was positive. The LED may turn red to indicate the characterization of the previous conversation that the first user had with the second user before reengaging the second user was negative.

The alert may be a vibration alert. The vibration alert may activate a vibration mechanism. The vibration mechanism may vibrate once to indicate the characterization of the previous conversation that the first user had with the second user before reengaging the second user was negative. The vibration mechanism may vibrate continually to indicate the characterization of the previous conversation that the first user had with the second user before reengaging the second user was positive.

The alert may be an audio alert. For example, an audio alert may be a favorite song of the first user to indicate the characterization of the previous conversation that the first user had with the second user before reengaging the second user was positive. The audio alert may be a least favorite song of the first user to indicate the characterization of the previous conversation that the first user had with the second user before reengaging the second user was negative.

As mentioned above, the notifying system (210) includes the updating engine (214-5). The updating engine (214-5) to, based on an analysis of the subsequent conversation between the first user and the second user, update the characterization to a current characterization in the database. The analysis of the subsequent conversation between the first user and the second user may be similar to the analysis described above for the previous conversation.

The current characterization updates the alert to reflect the subsequent conversation. For example, if the current characterization between the first user and user C (211-3) is now positive to reflect the subsequent conversation, alert B (222-2) may be updated to alert A (222-1).

An overall example of FIG. 2 will now be described. The characterization determining engine (214-1) determines based on an analysis of a previous conversation between a first user and user A (211-1) a characterization between the first user and user A (211-1). The second user may be user A (211-1). The storing engine (214-2) stores, in a database, the characterization associated with the previous conversation between the first user and user A (211-1) as characterization A (218-1). The characterization may be 0. The relationship determining engine (214-3) determines a relationship between the first user and user A (211-1). The relationship may be relationship A (220-1). The notifying engine (214-4), in response to the first user selecting, via a user device, an option to open a subsequent conversation with user A (211-1), notifies the first user via alert A (222-1) as to the characterization of the previous conversation that the first user had with user A (211-1) before reengaging user A (211-1) in a subsequent conversation. The updating engine (214-5) updates, based on an analysis of the subsequent conversation between the first user and user A (211-1), the characterization to a current characterization in the database (211-1). In this example, the current characterization is the same.

Figure 3A:
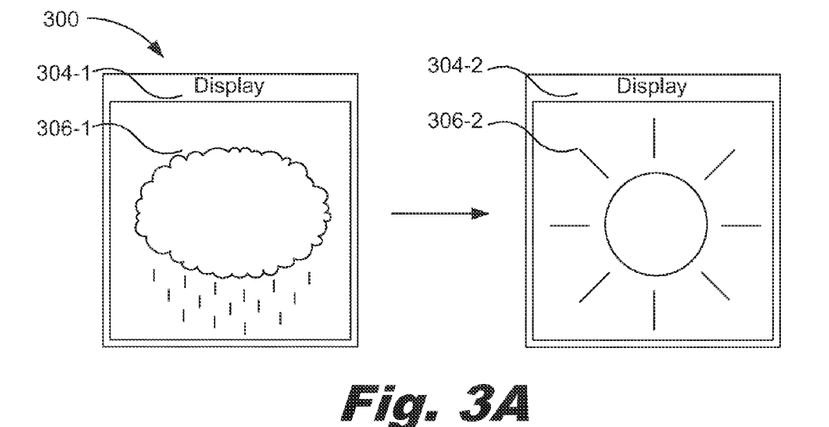
FIG. 3A is diagram of an example of a display alert, according to one example of principles described herein.
Figure 3B:
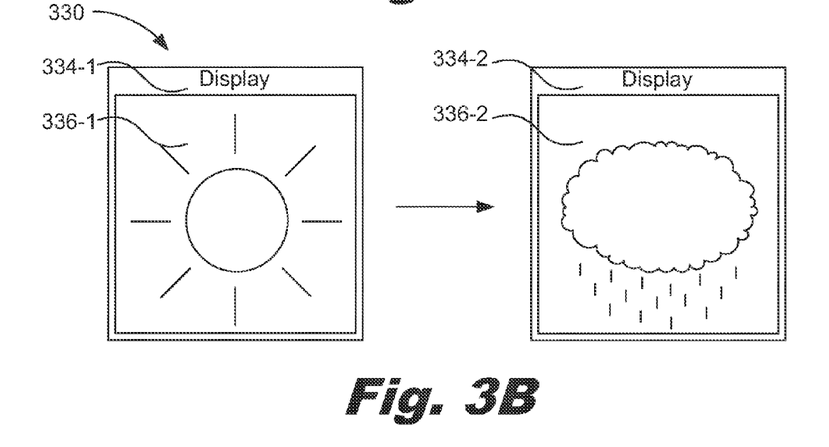
FIG. 3B is diagram of an example of a display alert, according to one example of principles described herein.
Figure 3C:
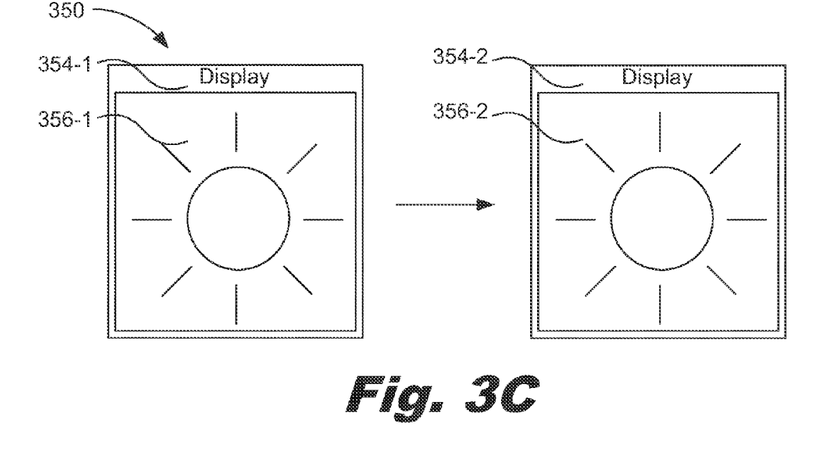
FIG. 3C is diagram of an example of a display alert, according to one example of principles described herein.

FIGS. 3A to 3C illustrate a display alert. The display alert may be updated based on a characterization of a conversation between a first user and a second user. While specific examples are given as to an image displayed, the image may be customized based on the user preferences. As mentioned above, other types of alerts may be activated as well.

FIG. 3A is diagram of an example of a display alert, according to one example of principles described herein. As will be described below, a display alert is displayed on a user device associated with the first user. Further, the display alert may be updated if the characterization of the conversation changes.

As illustrated, the user device (300) includes a display (304). The display (304) may be used to display a display alert (306). As mentioned above, in response to the first user selecting, via a user device, an option to open a subsequent conversation with the second user, the notifying system notifies the first user via an alert as to the characterization of the previous conversation that the first user had with the second user before reengaging the second user in a subsequent conversation. In this example, the display alert (306-1) on the user device (300) is a rain cloud. The rain cloud symbolizes the previous conversation between the first user and the user was negative. As a result, the first user may or may not reengage the second user in a subsequent conversation based on the display alert (306-1).

In an example, the first user may reengage the second user in a subsequent conversation. As mentioned above, based on an analysis of the subsequent conversation between the first user and the second user, the characterization is updated to a current characterization in a database. This current characterization may update the display alert before the first user reengages the second user in another conversation. In this example, the display alert (306-2) on the user device (300) is a sun. The sun symbolizes the subsequent conversation between the first user and the user was positive. As a result, the display alert (306) may be changed from a rain cloud to a sun.

A number of scenarios will now be given with reference to FIG. 3A. A first user has many friends and associates. The first user is often busy and talks to fifty other users a day. The first user desires to reengage a second user in a subsequent conversation via text. The first user brings up the second user's name on the display (334-1) and immediately the display (304-1) goes dark and illustrates a rain cloud. The first user remembers that their last interchange ended badly because the first user didn't like the second user's new boyfriend. The first user uses this information as he reengages the second user in the subsequent conversation. If the subsequent conversation ends well, the next time first user texts the second user, the first user will see a more positive alert such as a sun on the display (304-2).

Another scenario will now be given. A first user is an essentially happy person who really likes to use her phone for work and for play. The first user is at work and user B texts user A asking for a phone number of a plumber. Suddenly the first user's display (304-1) goes lavender and the first user's favorite sad song plays. The first user remembers that she's really mad at the second user because the second user didn't like her boyfriend. The first user answers the text anyway. As a result, an alert may include a display alert and an audio alert.

Another scenario will now be given. A first user is considering starting a business with a second user. The first user starts to call the second user. When the first user begins to call the second user, the first user's phone vibrates and shows a rain cloud on the display (304-1). The first user begins to remember that though they are great friends, they have recently had a falling out. As a result, the first user decides not to call the second user. As a result an alert may include a display alert and a vibration alert.

FIG. 3B is diagram of an example of a display alert, according to one example of principles described herein. As will be described below, a display alert is displayed on a user device associated with the first user. Further, the display alert may be updated if the characterization of the conversation changes.

As illustrated, the user device (330) includes a display (334). The display (334) may be used to display a display alert (336). As mentioned above, in response to the first user selecting, via a user device, an option to open a subsequent conversation with the second user, the notifying system notifies the first user via an alert as to the characterization of the previous conversation that the first user had with the second user before reengaging the second user in a subsequent conversation. In this example, the display alert (336-1) on the user device (330) is a sun. The sun symbolizes the previous conversation between the first user and the user was positive. As a result, the first user may or may not reengage the second user in a subsequent conversation based on the display alert (336-1).

In an example, the first user may reengage the second user in a subsequent conversation. As mentioned above, based on an analysis of the subsequent conversation between the first user and the second user, the characterization is updated to a current characterization in a database. In this example, the display alert (336-2) on the user device (330) is a now rain cloud. The rain cloud symbolizes the subsequent conversation between the first user and the user is negative. As a result, the display alert may be changed from a sun to a rain cloud.

FIG. 3C is diagram of an example of a display alert, according to one example of principles described herein. As will be described below, a display alert is displayed on a user device associated with the first user.

As illustrated, the user device (350) includes a display (354). The display (354) may be used to display a display alert (356). As mentioned above, in response to the first user selecting, via a user device, an option to open a subsequent conversation with the second user, the notifying system notifies the first user via an alert as to the characterization of the previous conversation that the first user had with the second user before reengaging the second user in a subsequent conversation. In this example, the display alert (356-1) on the user device (350) is a sun. The sun symbolizes the previous conversation between the first user and the user was positive. As a result, the first user may or may not reengage the second user in a subsequent conversation based on the display alert (356-1).

In an example, the first user may reengage the second user in a subsequent conversation. As mentioned above, based on an analysis of the subsequent conversation between the first user and the second user, the characterization is updated to a current characterization in a database. In this example, the display alert (356-2) on the user device (350) is still a sun. The sun symbolizes the subsequent conversation between the first user and the user is positive. As a result, the display alert is not changed.

A scenario will now be given with reference to FIG. 3C. A first user calls a second user. The first user has a historically combative relationship with the second user. During the previous conversation the first user argued and dickered. This previous conversation was normal for them. As a result, when the first use selects an option to reengage the second user in a subsequent conversation, display (354-1) shows a sun.

Figure 4:
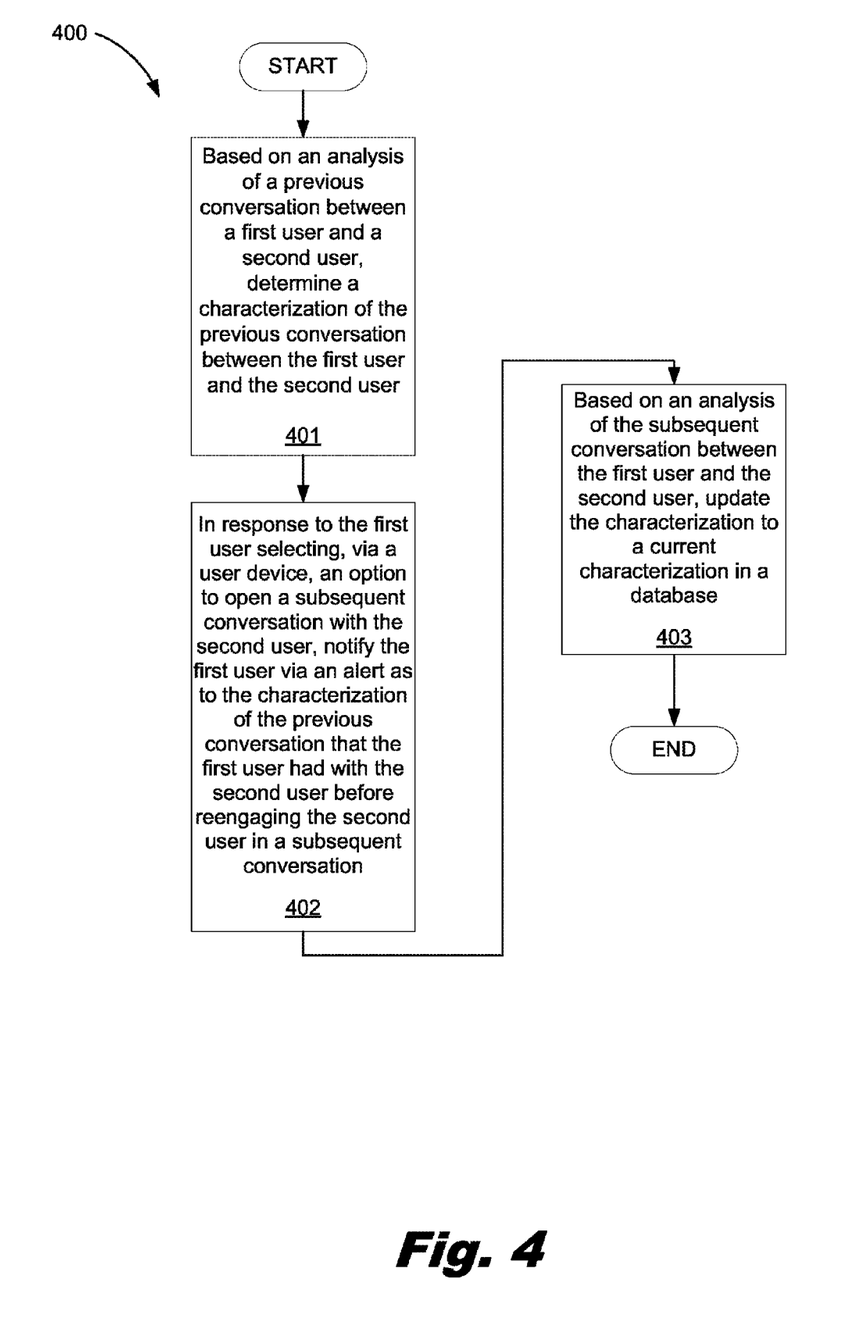
FIG. 4 is a flowchart of an example of a method for notifying a user about a previous conversation, according to one example of principles described herein.

FIG. 4 is a flowchart of an example of a method for notifying a user about a previous conversation, according to one example of principles described herein. In one example, the method (400) may be executed by system 100 of FIG. 1. In other examples, the method (400) may be executed by other systems such as system 200, system 600, or system 700. In this example, the method (400) includes based (401) on a previous conversation between a first user and second user determining a characterization between the first user and the second user, in response (402) to the first user selecting, via a user device, an option to open a subsequent conversation with the second user, notifying the first user via an alert as to the characterization of the previous conversation that the first user had with the second user before reengaging the second user in a subsequent conversation a user about a previous conversation, based (403) on an analysis of the subsequent conversation between the first user and the second user, updating the characterization to a current characterization in the database.

As mentioned above, the method (400) includes based (401) on a previous conversation between a first user and second user determining a characterization between the first user and the second user. In some examples the characterization is determined based on keywords, emoticons, NLP, or combinations thereof extracted during the previous conversation and the subsequent conversation. The characterization may be symbolic such as positive, neutral, or negative. The characterization may be a range such as 0 to 10.

As mentioned above, the method (400) includes in response (402) to the first user selecting, via a user device, an option to open a subsequent conversation with the second user, notifying the first user via an alert as to the characterization of the previous conversation that the first user had with the second user before reengaging the second user in a subsequent conversation a user about a previous conversation. The alert may include a display alert, a LED alert, a vibration alert, an audio alert, or combinations thereof. Further, the alert is customizable by the first user based on user preferences associated with the second user. In one example, the first user may be reengaging the second user in a subsequent conversation. In another example, the second user may be reengaging the first user in a subsequent conversation As mentioned above, the method (400) includes based (403) on an analysis of the subsequent conversation between the first user and the second user, updating the characterization to a current characterization in the database. The current characterization updates the alert to reflect the subsequent conversation.

Figure 5:
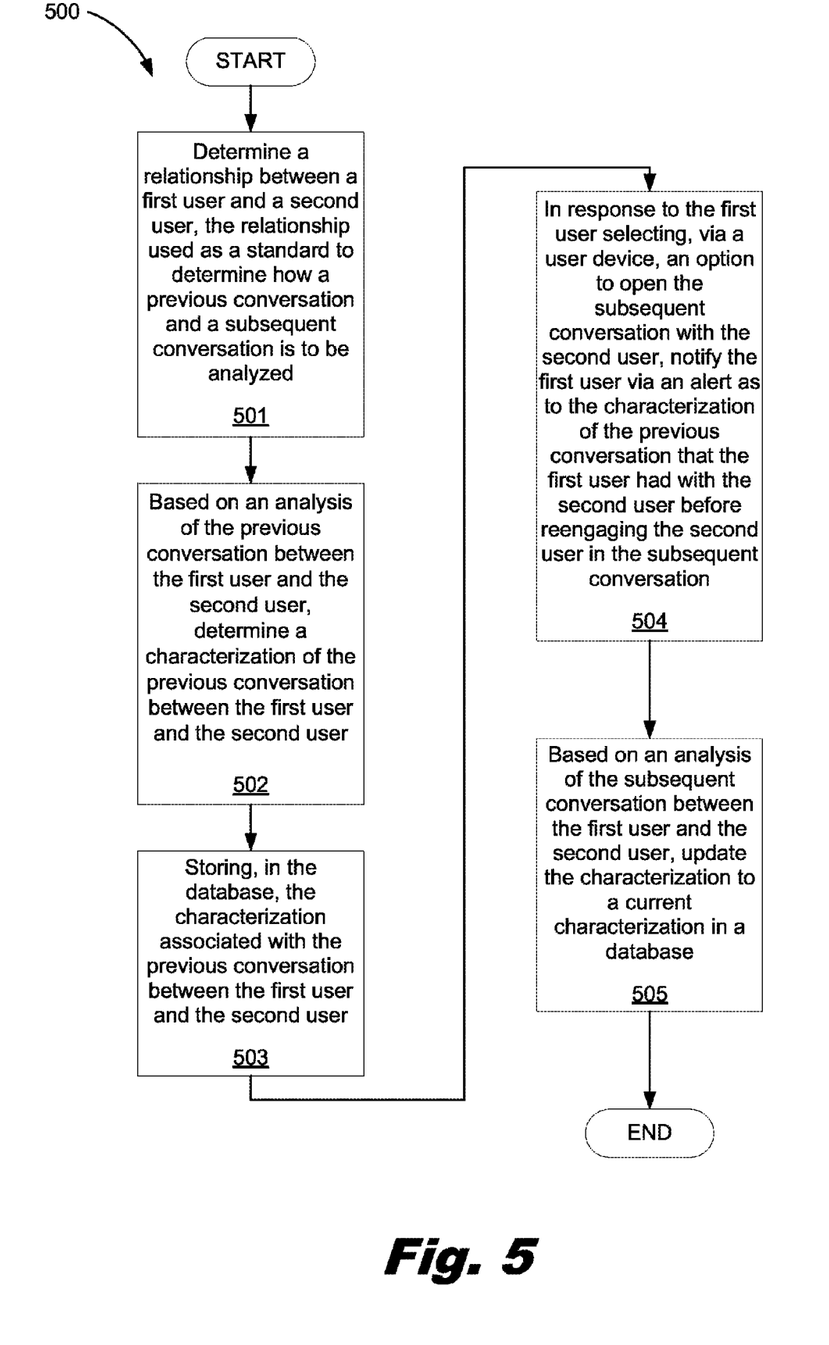
FIG. 5 is a flowchart of an example of a method for notifying a user about a previous conversation, according to one example of principles described herein.

FIG. 5 is a flowchart of an example of a method for notifying a user about a previous conversation, according to one example of principles described herein. In one example, the method (500) maybe executed by system 100 of FIG. 1. In other examples, the method (500) may be executed by other systems such as system 200, system 600, or system 700. In this example, the method (500) includes determining (501) a relationship between the first user and the second user, the relationship used as a standard to determine how the previous conversation and the subsequent conversation is to be analyzed, storing (502), in a database, the characterization associated with the previous conversation between the first user and the second user, based (503) on a previous conversation between a first user and second user determining a characterization between the first user and the second user, in response (504) to the first user selecting, via a user device, an option to open a subsequent conversation with the second user, notifying the first user via an alert as to the characterization of the previous conversation that the first user had with the second user before reengaging the second user in a subsequent conversation a user about a previous conversation, based (505) on an analysis of the subsequent conversation between the first user and the second user, updating the characterization to a current characterization in the database.

As mentioned above, the method (500) includes determining (501) a relationship between the first user and the second user, the relationship used as a standard to determine how the previous conversation and the subsequent conversation are to be analyzed. In some examples, the relationship may be symbolic such as positive, neutral, or negative. In other examples, the relationship may be a numeric range such as 0 to 10.

As mentioned above, the method (500) includes storing (502), in a database, the characterization associated with the previous conversation between the first user and the second user. In some examples, the database may include characterizations associated with at least one previous conversation for each user that the first user has initiated a conversation with via a user device.

Figure 6:
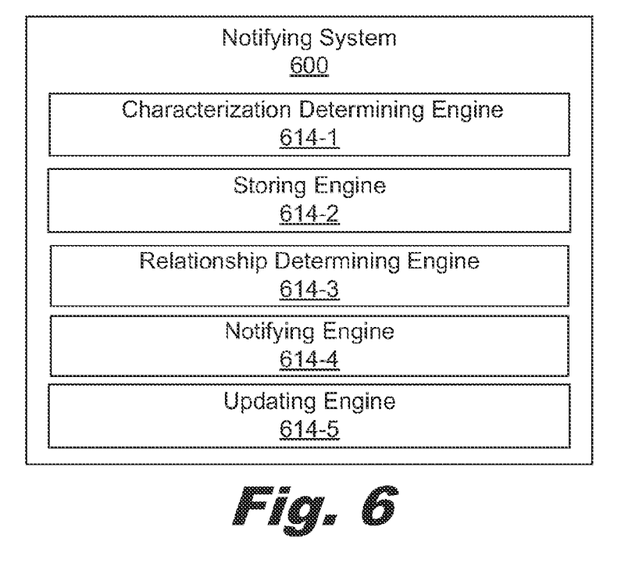
FIG. 6 is a diagram of an example of a notifying system, according to the principles described herein.

FIG. 6 is a diagram of an example of a notifying system, according to the principles described herein. The notifying system (600) includes a characterization determining engine (614-1), a storing engine (614-2), a relationship determining engine (614-3), a notifying engine (614-4), and an updating engine (614-5). The engines (614) refer to a combination of hardware and program instructions to perform a designated function. Alternatively, the engines (614) may be implemented in the form of electronic circuitry (e.g., hardware). Each of the engines (614) may include a processor and memory. Alternatively, one processor may execute the designated function of each of the engines (614). The program instructions are stored in the memory and cause the processor to execute the designated function of the engine.

The characterization determining engine (614-1) to, based on an analysis of a previous conversation between a first user and second user determine a characterization between the first user and the second user. The characterization determining engine (614-1) to, based on an analysis of a several previous conversations between a first user and second user determine several characterizations between the first user and the second user.

The storing engine (614-2) stores, in a database, the characterization associated with the previous conversation between the first user and the second user. The storing engine (614-2) stores, in a database, the characterizations associated with the previous conversations between the first user and the second user.

The relationship determining engine (614-3) determines a relationship between the first user and the second user, the relationship used as a standard to determine how the previous conversation and the subsequent conversation are to be analyzed. The relationship determining engine (614-3) determines one relationship. The relationship determining engine (614-3) determines several relationships.

The notifying engine (614-4) to, in response to the first user selecting, via a user device, an option to open a subsequent conversation with the second user, notify the first user via an alert as to the characterization of the previous conversation that the first user had with the second user before reengaging the second user in the subsequent conversation. The notifying engine (614-4) to, in response to the first user selecting, via a user device, an option to open a subsequent conversation with the second user, notify the first user via several alerts as to the characterization of the previous conversation that the first user had with the second user before reengaging the second user in a subsequent conversation.

The updating engine (614-5) to, based on an analysis of the subsequent conversation between the first user and the second user, update the characterization to a current characterization in the database. The updating engine (614-5) to, based on an analysis of the subsequent conversation between the first user and the second user, update several characterizations to a current characterization in the database.

Figure 7:
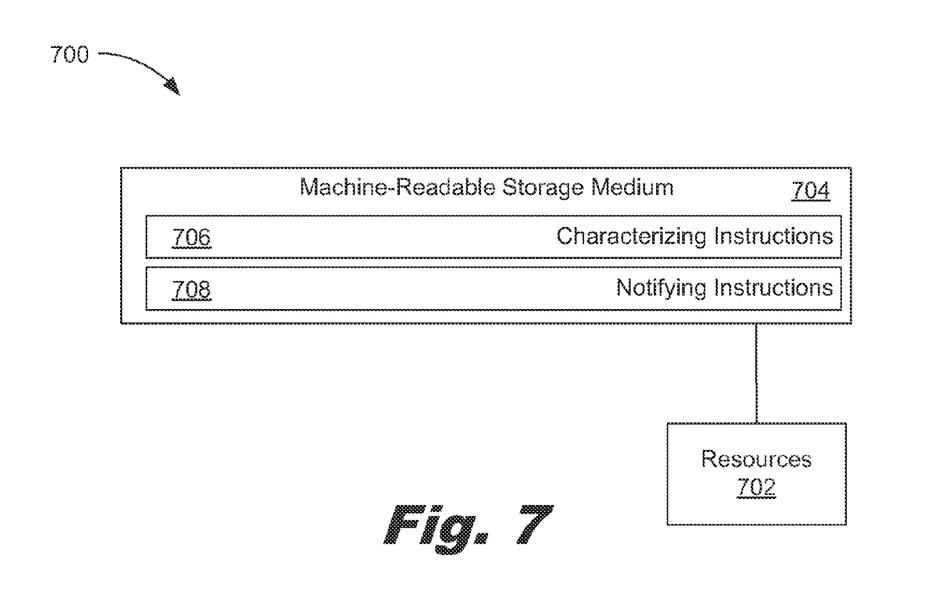
FIG. 7 is a diagram of an example of a notifying system, according to the principles described herein.

FIG. 7 is a diagram of an example of a notifying system, according to the principles described herein. In this example, the notifying system (700) includes resource(s) (702) that are in communication with a machine-readable storage medium (704). Resource(s) (702) may include one processor. In another example, the resource(s) (702) may further include second processor and other resources used to process instructions. The machine-readable storage medium (704) represents generally any memory capable of storing data such as instructions or data structures used by the notifying system (700). The instructions shown stored in the machine-readable storage medium (704) include characterizing instructions (706) and notifying instructions (708).

The machine-readable storage medium (704) contains computer readable program code to cause tasks to be executed by the resource(s) (702). The machine-readable storage medium (704) may be tangible and/or physical storage medium. The machine-readable storage medium (704) may be any appropriate storage medium that is not a transmission storage medium. A non-exhaustive list of machine-readable storage medium types includes non-volatile memory, volatile memory, random access memory, write only memory, flash memory, electrically erasable program read only memory, or types of memory, or combinations thereof.

The characterizing instructions (706) represents instructions that, when executed, cause the resource(s) (702) to, based on an analysis of a previous conversation between a first user and second user determines a characterization between the first user and the second user. The notifying instructions (708) represents instructions that, when executed, cause the resource(s) (702) to, in response to the first user selecting, via a user device, an option to open a subsequent conversation with the second user, notifying the first user via an alert as to the characterization of the previous conversation that the first user had with the second user before reengaging the second user in a subsequent conversation.

Further, the machine-readable storage medium (704) may be part of an installation package. In response to installing the installation package, the instructions of the machine-readable storage medium (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid Characterization hard drive, or the like.

In some examples, the resource(s) (702) and the machine-readable storage medium (704) are located within the same physical component, such as a server, or a network component. The machine-readable storage medium (704) may be part of the physical component's main memory, caches, registers, non-volatile memory, or elsewhere in the physical component's memory hierarchy. Alternatively, the machine-readable storage medium (704) may be in communication with the resource(s) (702) over a network. Further, the data structures, such as the libraries, may be accessed from a remote location over a network connection while the programmed instructions are located locally. Thus, the notifying system (700) may be implemented on a user device, on a server, on a collection of servers, or combinations thereof.

The notifying system (700) of FIG. 7 may be part of a general purpose computer. However, in alternative examples, the notifying system (700) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of features, integers, operations, elements, and/or components, but do not preclude the presence or addition of a number of other features, integers, operations, elements, components, and/or groups thereof.

What is claimed is:

1. A system for notifying a user about a previous conversation, the system comprising:
    a processor;
    computer program code, communicatively coupled to the processor, the computer program code comprising:
    a relationship determining engine to determine a degree to which a relationship between a first user and a second user is argumentative, the degree to which the relationship is argumentative being used as a standard to determine how the previous conversation and a subsequent conversation is to be analyzed;
    a characterization determining engine to, based on an analysis of the previous conversation between the first user and the second user, and using the determined degree to which the relationship is argumentative, determine a characterization of the previous conversation between the first user and the second user, the characterization specifying whether the previous conversation was positive, neutral or negative;
a storing engine to store, in a database, the characterization associated with the previous conversation between the first user and the second user;
a notifying engine to, in response to the first user selecting, via a user device, an option to open the subsequent conversation with the second user, notify the first user via an alert as to the characterization of the previous conversation that the first user had with the second user before reengaging the second user in the subsequent conversation; and
an updating engine to, based on an analysis of the subsequent conversation between the first user and the second user, update the characterization to a current characterization in the database.

2. The system of claim 1, wherein the characterization associated with the previous conversation and the current characterization associated with the subsequent conversation is determined based on keywords, emoticons, natural language processing (NLP), or combinations thereof extracted during the previous conversation and the subsequent conversation respectively.

3. The system of claim 1, wherein the alert is customizable based on user preferences.

4. The system of claim 1, wherein the alert is a display alert, a light-emitting diode (LED) alert, a vibration alert, an audio alert, or combinations thereof.

5. The system of claim 1, wherein the alert is updated to reflect the current characterization associated with the subsequent conversation between the first user and the second user.

6. A machine-readable, non-volatile storage medium encoded with instructions, the instructions executable by a processor of a system to cause the system to:
determine a degree to which a relationship between a first user and second user is argumentative;
based on both the determined degree to which the relationship is argumentative and an analysis of a previous conversation between the first user and the second user, determine a characterization of the previous conversation between the first user and the second user; and
in response to the first user selecting, via a user device, an option to open a subsequent conversation with the second user, notify the first user via an alert as to the characterization of the previous conversation that the first user had with the second user before reengaging the second user in the subsequent conversation.

7. The machine-readable, non-volatile storage medium of claim 6, further comprising instructions that, when executed, cause the processor to determine a relationship between the first user and the second user, the relationship used as a standard to determine how the previous conversation and the subsequent conversation is to be analyzed.

8. The machine-readable, non-volatile storage medium of claim 6, further comprising instructions that, when executed, cause the processor to store, in a database, the characterization associated with the previous conversation between the first user and the second user.

9. The machine-readable, non-volatile storage medium of claim 6, further comprising instructions that, when executed, cause the processor to based on an analysis of the subsequent conversation between the first user and the second user, update the characterization to a current characterization in a database.

10. The machine-readable, non-volatile storage medium of claim 6, wherein the characterization associated with the previous conversation and a current characterization associated with the subsequent conversation is determined based on keywords, emoticons, natural language processing (NLP), or combinations thereof extracted during the previous conversation and the subsequent conversation respectively.

11. The machine-readable, non-volatile storage medium of claim 6, wherein the alert is customizable based on user preferences.

12. The machine-readable, non-volatile storage medium of claim 6, wherein the alert is a display alert, a light-emitting diode (LED) alert, a vibration alert, an audio alert, or combinations thereof.

13. The machine-readable, non-volatile storage medium of claim 6, the alert is updated to reflect a current characterization associated with the subsequent conversation between the first user and the second user.

* * * * *